United States Patent
Huang et al.

(10) Patent No.: US 8,952,921 B2
(45) Date of Patent: Feb. 10, 2015

(54) CAPACITIVE TOUCH DISPLAY PANEL AND CAPACITIVE TOUCH BOARD

(75) Inventors: Yen-Liang Huang, Hsin-Chu (TW);
Wei-Hung Kuo, Hsin-Chu (TW);
Chau-Shiang Huang, Hsin-Chu (TW);
Tun-Chun Yang, Hsin-Chu (TW);
Seok-Lyul Lee, Hsin-Chu (TW);
Wei-Ming Huang, Hsin-Chu (TW)

(73) Assignee: AU Optronics Corp., Science-Based Industrial Park, Hsin-Cu (TW)

( * ) Notice: Subject to any disclaimer, the term of this patent is extended or adjusted under 35 U.S.C. 154(b) by 593 days.

(21) Appl. No.: 13/033,613

(22) Filed: Feb. 24, 2011

(65) Prior Publication Data

US 2011/0157084 A1    Jun. 30, 2011

Related U.S. Application Data

(63) Continuation-in-part of application No. 12/766,934, filed on Apr. 26, 2010.

(30) Foreign Application Priority Data

Dec. 30, 2009  (TW) ............... 98145952 A
Aug. 11, 2010  (TW) ............... 99126726 A

(51) Int. Cl.
   *G06F 3/044*   (2006.01)

(52) U.S. Cl.
   CPC .................... *G06F 3/044* (2013.01)
   USPC ....................................... 345/174

(58) Field of Classification Search
   CPC ................ G06F 3/045; G06F 3/044
   USPC ............................................ 345/173, 174
   See application file for complete search history.

(56) References Cited

U.S. PATENT DOCUMENTS

| | | | |
|---|---|---|---|
| 6,175,394 B1 | 1/2001 | Wu | |
| 6,690,433 B2 | 2/2004 | Yoo | |
| 7,076,089 B2* | 7/2006 | Brandt et al. | 382/124 |
| 7,158,194 B2 | 1/2007 | Lo | |
| 7,280,327 B2 | 10/2007 | Lai | |
| 7,324,351 B2 | 1/2008 | Aoki | |
| 7,332,379 B2 | 2/2008 | Chen | |
| 7,408,751 B1* | 8/2008 | Lien et al. | 361/56 |
| 2006/0279510 A1 | 12/2006 | Lai | |
| 2008/0007534 A1* | 1/2008 | Peng et al. | 345/173 |
| 2008/0186288 A1* | 8/2008 | Chang | 345/174 |
| 2008/0309633 A1 | 12/2008 | Hotelling | |

(Continued)

FOREIGN PATENT DOCUMENTS

| | | |
|---|---|---|
| TW | 594187 | 6/2004 |
| TW | I281569 | 5/2007 |

(Continued)

*Primary Examiner* — Claire X Pappas
*Assistant Examiner* — James M Holland
(74) *Attorney, Agent, or Firm* — Winston Hsu; Scott Margo

(57) ABSTRACT

A capacitive touch display panel includes a display panel, a touch sensing unit, and a plurality of diode ESD protection devices. The touch sensing unit includes a plurality of first sensing pads and second sensing pads. Each diode ESD protection device is disposed between two adjacent first sensing pads and between two adjacent second sensing pads. The two adjacent first sensing pads are electrically disconnected from each other, and the two adjacent second sensing pads are electrically disconnected from each other.

17 Claims, 18 Drawing Sheets

(56) References Cited

U.S. PATENT DOCUMENTS

| | | | |
|---|---|---|---|
| 2009/0262094 A1* | 10/2009 | Lin | 345/174 |
| 2009/0284484 A1 | 11/2009 | Hwang | |
| 2010/0007616 A1* | 1/2010 | Jang | 345/173 |
| 2010/0073310 A1* | 3/2010 | Liang et al. | 345/173 |
| 2011/0057887 A1* | 3/2011 | Lin et al. | 345/173 |

FOREIGN PATENT DOCUMENTS

| | | |
|---|---|---|
| TW | 200824127 | 6/2008 |
| TW | 200950611 | 12/2009 |

* cited by examiner

US 8,952,921 B2

CAPACITIVE TOUCH DISPLAY PANEL AND CAPACITIVE TOUCH BOARD

CROSS REFERENCE TO RELATED APPLICATIONS

This application is a continuation in part of U.S. application Ser. No. 12/766,934, filed Apr. 26, 2010. The prior application Ser. No. 12/766,934 claims the benefit of Taiwan Patent Application No. 098145952 filed Dec. 30, 2009. This application claims the benefit of Taiwan Patent Application No. 099126726 filed Aug. 11, 2010.

BACKGROUND OF THE INVENTION

1. Field of the Invention

The present invention relates to a capacitive touch display panel and a capacitive touch board, and more particularly, to a capacitive touch display panel and a capacitive touch board having diode ESD protection devices disposed in a sensing region.

2. Description of the Prior Art

In present consumer electronics, tablet mobile phones, global positioning systems (GPS), multimedia players and other portable electronic devices widely use touch panels as the data communicational interface between human and the electronic devices. Because designs of the present consumer electronics stress small size, traditional inputting devices, such as keypad and mouse, which occupy some spaces of the present consumer electronics, are desired to be saved in the product design, so that the inputting method for the present consumer electronics adopts a touching method. In addition, with appearance of the operating system (OS) software for the touching method, requirements for the touch panel can be expected to further raise.

A capacitive touch panel is a mainstream of the present touch panel. However, in the duration of manufacture or usage, the capacitive touch panel often generates electrostatic discharge (ESD) due to rub or other reasons. Therefore, too many electrostatic charges may result in the damage of the touch sensing unit, so that the yield and the reliability of the capacitive touch panel is reduced.

SUMMARY OF THE INVENTION

It is one of the objectives of the present invention to provide a capacitive touch display panel and a capacitive touch board to raise electrostatic discharge (ESD) protection.

The present invention provides a capacitive touch display panel including a display panel, a touch sensing unit, and a plurality of diode ESD protection devices. The display panel includes a sensing region. The touch sensing unit is disposed in the sensing region of the display panel, and the touch sensing unit includes a plurality of first sensing series disposed along a first direction, and a plurality of second sensing series disposed along a second direction. Each of the first sensing series includes a plurality of first sensing pads electrically connected to each other, and each of the second sensing series includes a plurality of second sensing pads electrically connected to each other. The diode ESD protection devices are disposed in the sensing region of the display panel. Each diode ESD protection device is disposed at least between one of the first sensing pads and one of the second sensing pads adjacent to each other, and each of the diode ESD protection devices comprises at least one transistor device.

The present invention further provides a capacitive touch board including a substrate, a touch sensing unit, and a plurality of diode ESD protection devices. The substrate has a sensing region. The touch sensing unit is disposed in the sensing region of the substrate, and the touch sensing unit includes a plurality of first sensing series, disposed along a first direction, and a plurality of second sensing series, disposed along a second direction. Each of the first sensing series includes a plurality of first sensing pads electrically connected to each other, and each of the second sensing series includes a plurality of second sensing pads electrically connected to each other. The diode ESD protection devices are disposed in the sensing region of the substrate. Each diode ESD protection device is disposed between one of the first sensing pads and one of the second sensing pads adjacent to each other, and each of the diode ESD protection devices includes at least one transistor device.

The capacitive touch device of the present invention disposes the floating gate type ESD protection device in the sensing region, so that the ESD protection ability of the capacitive touch device can be effectively enhanced.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention, preferred embodiments will be detailed as follows. The preferred embodiments of the present invention are illustrated in the accompanying drawings with numbered elements to elaborate the contents and effects to be achieved.

Figure 1:
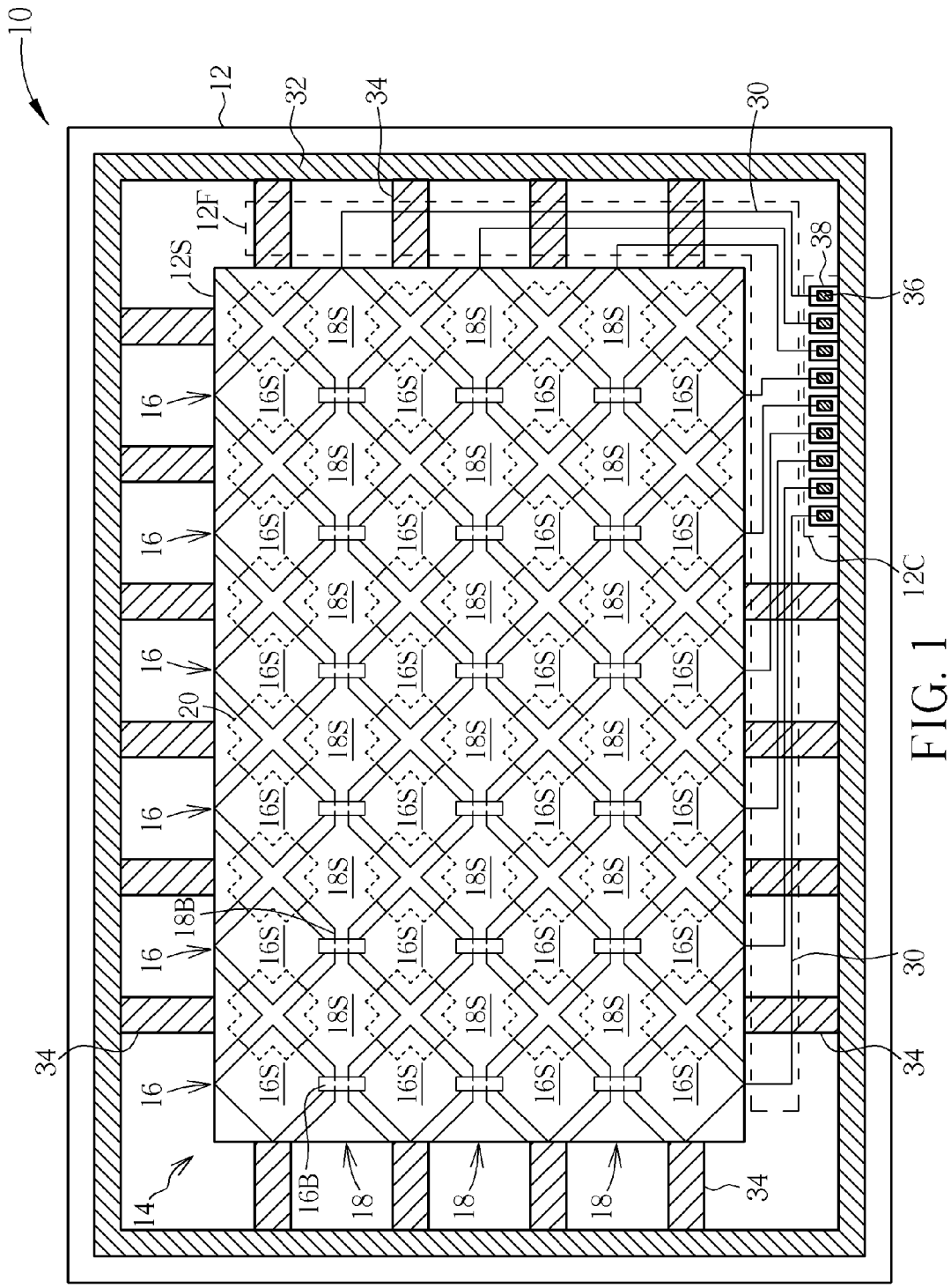
FIG. 1 is a schematic diagram illustrates a capacitive touch device according to a preferred embodiment of the present invention.

Please refer to FIG. 1, which is a schematic diagram illustrates a capacitive touch device according to a preferred embodiment of the present invention. FIG. 1 illustrates an embodiment of the present invention in order to easily understand the present invention, and does not limit the scope of the present invention. The detailed ratio of the present invention can be adjusted according to designed requirements. In this embodiment, the capacitive touch device can be a capacitive touch display panel having double functions of touch input and display. In other words, the capacitive touch sensing unit is integrated into a manufacturing process for a display panel, such as a liquid crystal display panel. But, the present invention is not limited to this. For example, the capacitive touch device also can be the capacitive touch substrate only having touch inputting function, and a capacitive touch display panel can be formed by utilizing an attaching method to combine the capacitive touch substrate with a display panel. As shown in FIG. 1, the capacitive touch device 10 of this embodiment includes a display panel 12, a touch sensing unit 14 disposed on the display panel 12 and a plurality of electrostatic discharging (ESD) protection devices e.g. floating gate type ESD protection devices 20 disposed on the display panel 12. The display panel 12 has a sensing region 12S defined thereon. It is worthy to say that when the capacitive touch device 10 is the capacitive touch substrate only having touch inputting function, the display panel 12 can be replaced with a substrate or a base material, such as a glass substrate, a plastic substrate or a printed circuit board, etc., and the display panel 12 is applied to other devices that require touch input. The touch sensing unit 14 is disposed in the sensing region 12S of the display panel 12, and the touch sensing unit 14 includes a plurality of first sensing series 16 disposed along a first direction (as shown by a vertical direction in FIG. 1) and a plurality of second sensing series 18 disposed along a second direction (as shown by a horizontal direction in FIG. 1). Each of the first sensing series 16 includes a plurality of first sensing pads 16S electrically connected to each other, and each of the second sensing series 18 includes a plurality of second sensing pads 18S electrically connected to each other. When the touch input is performed, a finger of a user or other input devices can be combined with a part of the corresponding first sensing pads 16S and the corresponding second sensing pads 18S to form a capacitor, so that an effect of touch input can be achieved. The floating gate type ESD protection devices 20 are disposed in the sensing region 12S, and each floating gate type ESD protection device 20 is disposed between two adjacent first sensing pads 16S and between two adjacent second sensing pads 18S. The two adjacent first sensing pads 16S are electrically disconnected from each other, and the two adjacent second sensing pads 18S are electrically disconnected from each other. The floating gate type ESD protection devices 20 provide ESD protection, and the following description will detail a structure and an ESD protection principle of each floating gate type ESD protection device 20.

Figure 2:
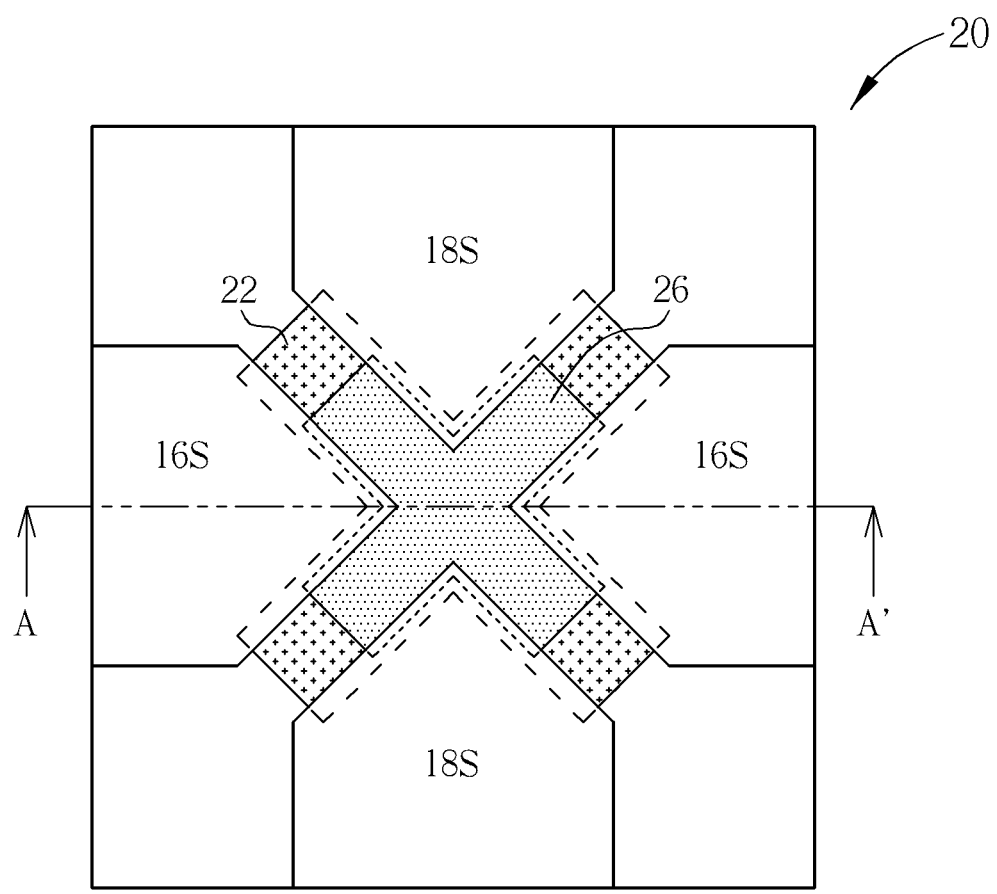
FIG. 2 is a schematic diagram illustrating a top view of the floating gate type ESD protection device according to this embodiment.
Figure 3:
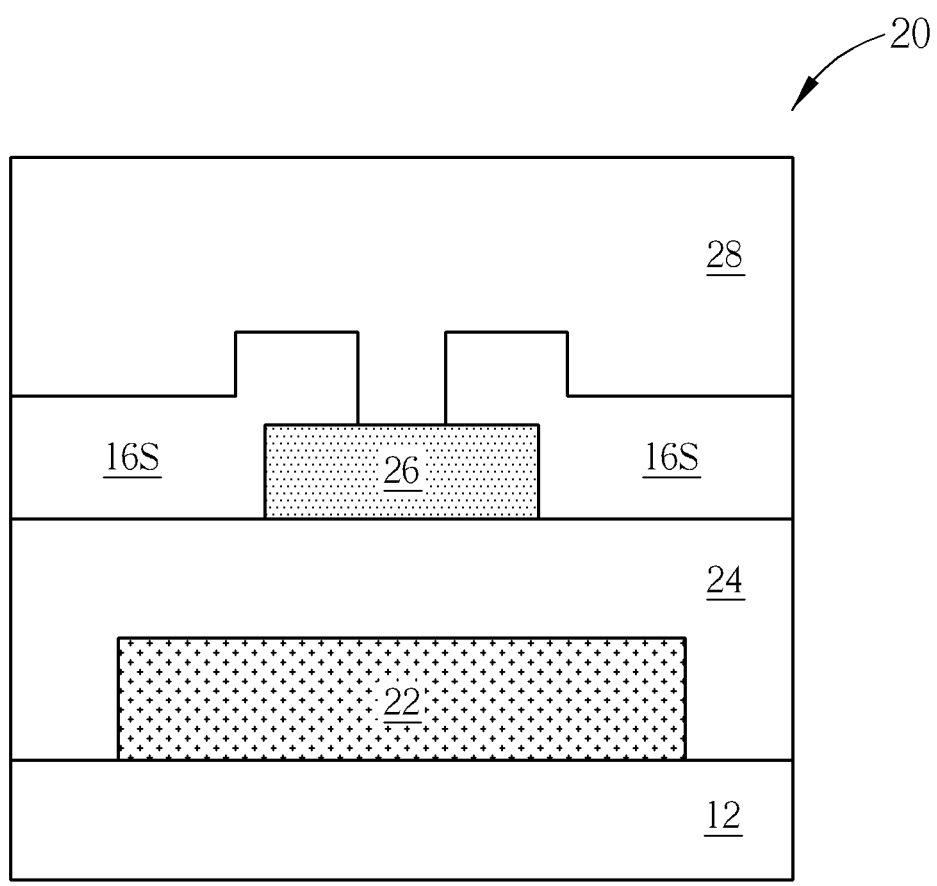
FIG. 3 is a schematic diagram illustrating a cross-sectional view of the floating gate type ESD protection device along line AA' in FIG. 2 according to this embodiment.

Please refer to FIG. 2 and FIG. 3, which are enlarged schematic diagrams illustrating a region of each floating gate type ESD protection device, and refer to FIG. 1 together. FIG. 2 is a schematic diagram illustrating a top view of the sensing region floating gate type ESD protection device according to this embodiment. FIG. 3 is a schematic diagram illustrating a cross-sectional view of the sensing region floating gate type ESD protection device along line AA' in FIG. 2 according to this embodiment. As shown in FIG. 2 and FIG. 3, each floating gate type ESD protection device 20 includes a patterned conductive layer 22, such as a patterned metal layer, a dielectric layer 24, a patterned semiconductor layer 26, such as a amorphous silicon layer, connected to the adjacent first sensing pads 16S or the adjacent second sensing pads 18S. In addition, an insulating layer 28 covers the floating gate type ESD protection device 20, the adjacent first sensing pads 16S and the adjacent second sensing pads 18S, so that the floating gate type ESD protection device 20, the adjacent first sensing pads 16S and the adjacent second sensing pads 18S can be protected. The patterned semiconductor layer 26 of each floating gate type ESD protection device 20 is in contact with and partially overlaps two adjacent first sensing pads 16S which are electrically disconnected from each other and two adjacent second sensing pads 18S which are electrically disconnected from each other, respectively. The patterned conductive layer 22 of each floating gate type ESD protection device 20 partially overlaps the first sensing pads 16S and the second sensing pads 18S, respectively. In this embodiment, the patterned conductive layer 22 is disposed on the display panel 12. The dielectric layer 24 is disposed on patterned conductive layer 22. The patterned semiconductor layer 26 is disposed on the dielectric layer 24. The first sensing pads 16S and the second sensing pads 18S are disposed on the patterned semiconductor layer 26. The insulating layer 28 covers the first sensing pads 16S, the second sensing pads 18S and the patterned semiconductor layer 26. The material of the dielectric layer 24 can be any kind of organic or inorganic dielectric material, and is preferable to a dielectric material with low-k, so that the damage resulted from the electrostatic charges can be reduced. In addition, the thickness of the dielectric layer 24 can be adjusted according to the requirements, and the dielectric layer 24 also can be manufactured to be a patterned layer as long as the patterned conductive layer 22 is covered. In each floating gate type ESD protection device 20 of this embodiment, the patterned conductive layer 22 provides a function of a gate electrode. The dielectric layer 24 provides a function of a gate dielectric layer. The patterned semiconductor layer 26 is used as a channel. The two adjacent first sensing pads 16S which are electrically disconnected from each other and two adjacent second sensing pads 18S which are electrically disconnected from each other are used as source/drain electrode. By disposing the floating gate type ESD protection device 20, when the electrostatic charges accumulate at the touch sensing unit 14 due to the capacitive touch panel device 10 being rubbed or other reasons, a large number of electrostatic charges induce the floating gate type ESD protection device 20 to turn on. That is to say that a large number of electrostatic charges at the first sensing pads 16S or the second sensing pads 18S are coupled to the patterned conductive layer 22 to form an electric potential, so that the patterned semiconductor layer 26 is turned on. The floating gate type ESD protection device 20 is therefore turned on. In the meantime, the electrostatic charges accumulated at the specific first sensing pad 16S or second sensing pad 18S can be rapidly transferred to the adjacent first sensing pad 16S or the adjacent second sensing pad 18S. If the number of the electrostatic charges is still too many, the adjacent floating gate type ESD protection device 20 still will be induced to turn on, and the electrostatic charges are continuously transferred to the adjacent first sensing pad 16S or the adjacent second sensing pad 18S. For this reason, a bridge line 16B used to connect the adjacent first sensing pads 16S or a bridge line 18B used to connect the adjacent second sensing pads 18B can be prevented from being burned out by the overlarge electrostatic charges, so that the ESD protection is achieved.

Figure 4:
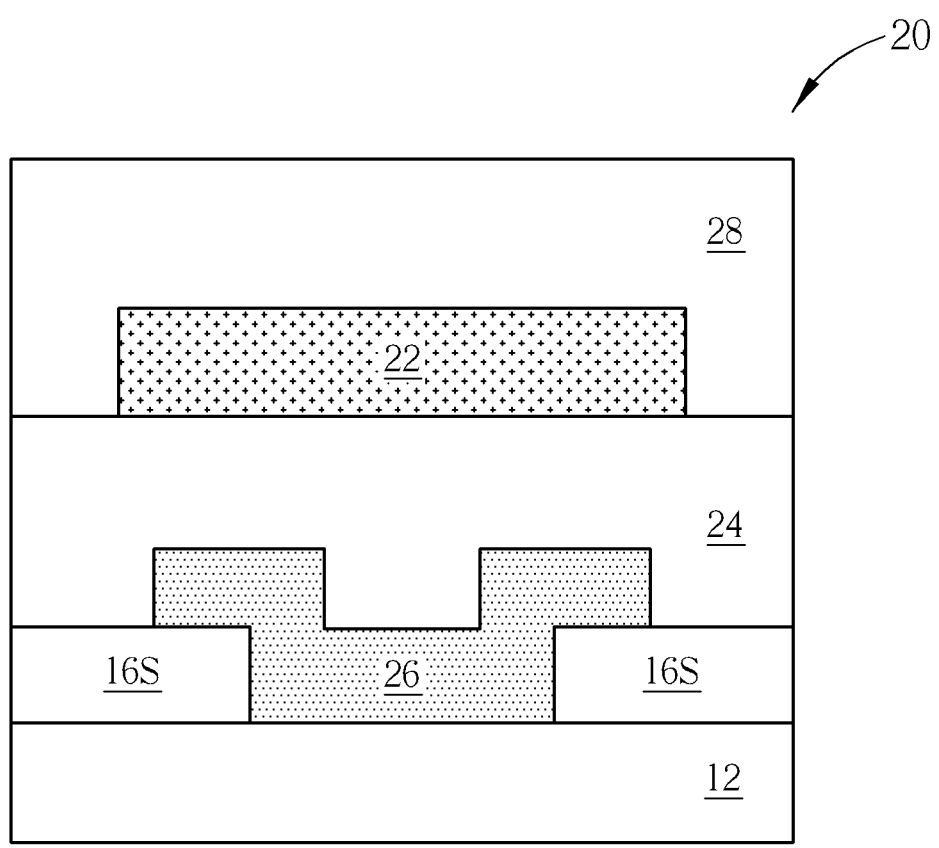
FIG. 4 is a schematic diagram illustrating a cross-sectional view of a floating gate type ESD protection device according to another embodiment of the present invention.

In the above-mentioned embodiment, the patterned conductive layer 22 of the floating gate type ESD protection device 20 is disposed on the display panel 12. The dielectric layer 24 is disposed on the patterned conductive layer 22. The patterned semiconductor layer 26 is disposed on the dielectric layer 24. The first sensing pads 16S and the second sensing pads 18S are disposed on the patterned semiconductor layer 26. The patterned conductive layer 22 can be selectively manufactured with the bridge line 18B between the second sensing pads 18S, and the dielectric layer 24 can be selectively manufactured with the dielectric layer (not shown in figure) between the bridge line 18B and the bridge line 16B. Therefore, the manufacturing process can be simplified, and manufacturing cost can be reduced. But, the present invention is not limited to this. The structure of the floating gate type ESD protection device in the present invention is not limited to this, and can be other embodiments. Please refer to FIG. 4, and refer to FIG. 1 together. FIG. 4 is a schematic diagram illustrating a cross-sectional view of a sensing region floating gate type ESD protection device according to another embodiment of the present invention. As shown in FIG. 4, the patterned semiconductor layer 26 of each floating gate type ESD protection device 20 is disposed on the display panel 12. The dielectric layer 24 of each floating gate type ESD protection device 20 is disposed on the patterned semiconductor layer 26, the first sensing pad 16S and the second sensing pad 18S (not shown in FIG. 4). The patterned conductive layer 22 of each floating gate type ESD protection device 20 is disposed on the dielectric layer 24.

Figure 5:
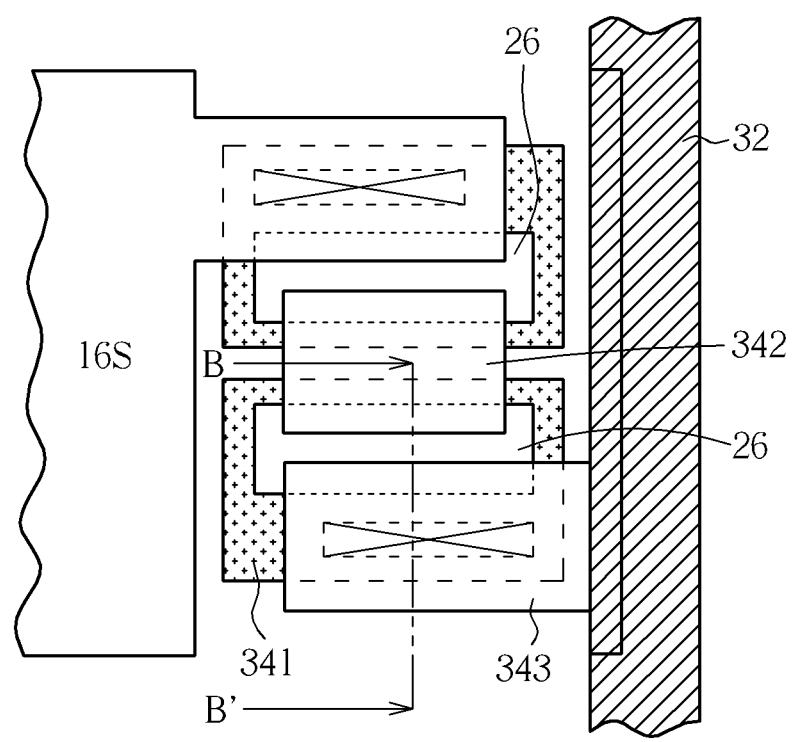
FIG. 5 is a schematic diagram illustrating a top view of a connection line region ESD protection device according to this embodiment.
Figure 6:
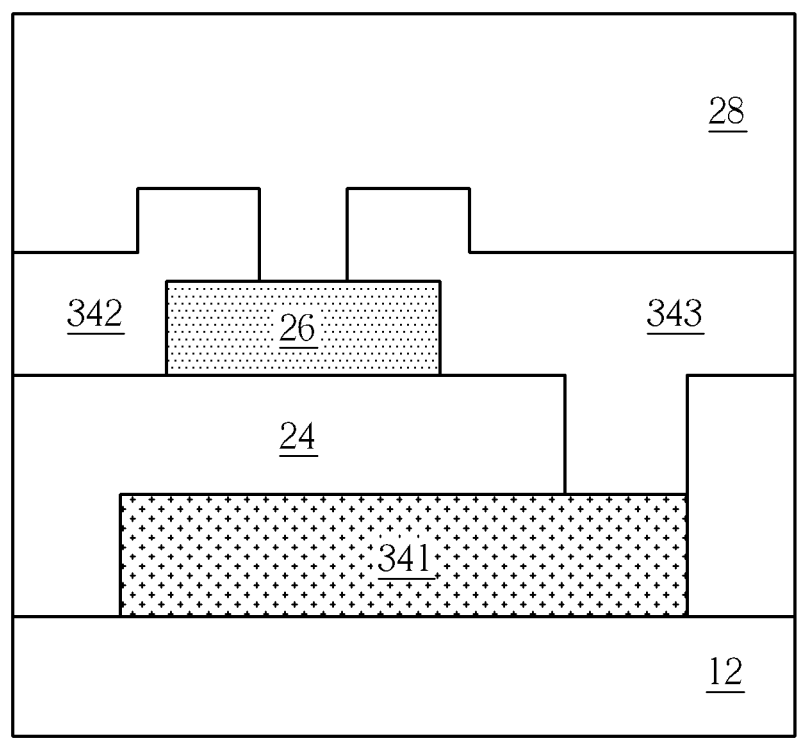
FIG. 6 is a schematic diagram illustrating a cross-sectional view of the connection line region ESD protection device along line BB' in FIG. 5 according to this embodiment.

As the above-mentioned description, the present invention utilizes the floating gate type ESD protection device 20 disposed in the sensing region 12S to provide the ESD protection that the capacitive touch device 10 requires, but the capacitive touch device 10 of the present invention can selectively dispose extra ESD protection devices at periphery of the display panel 12, such as a connection line region and a contact pad region, to further enhance the ESD protection. Please refer to FIG. 5 and FIG. 6, and refer to FIG. 1 together. FIG. 5 and FIG. 6 are schematic diagrams illustrating a connection line region ESD protection device according to a preferred embodiment of the present invention. FIG. 5 is a schematic diagram illustrating a top view of the connection line region ESD protection device according to this embodiment, and FIG. 6 is a schematic diagram illustrating a cross-sectional view of the connection line region ESD protection device along line BB' in FIG. 5 according to this embodiment. As shown in FIG. 1, the display panel 12 of the capacitive touch device 10 further includes a connection line region (or fan out region) 12F, a plurality of connection lines 30 disposed in the connection line region 12F, a guard ring 32 disposed in the connection line region 12F, and a plurality of connection line region ESD protection devices 34. The connection lines 30 respectively electrically connect the first sensing series 16 and the second sensing series 18 for transferring signals that the touch sensing unit 14 receives. Each connection line region ESD protection device 34 is electrically connected to the corresponding connection line 30 and the guard ring 32, respectively. As shown in FIG. 1, FIG. 5 and FIG. 6, in this embodiment, the connection line region ESD protection device 34 is a diode ESD protection device, which includes a transistor device or several transistor devices. The transistor device includes a gate electrode 341, a dielectric layer 24, a patterned semiconductor layer 26, two source/drain electrodes 342, 343 and an insulating layer 28. The source/drain 342 is electrically connected to the corresponding first sensing series 16 or second sensing series 18, and the source/drain electrode 343 is electrically connected to the gate electrode 341 and the guard ring 32. By the above-mentioned connecting method, the transistor device can have a character of diode device, so that the connection line region ESD protection device 34 of this embodiment can provide ESD protection.

Figure 7:
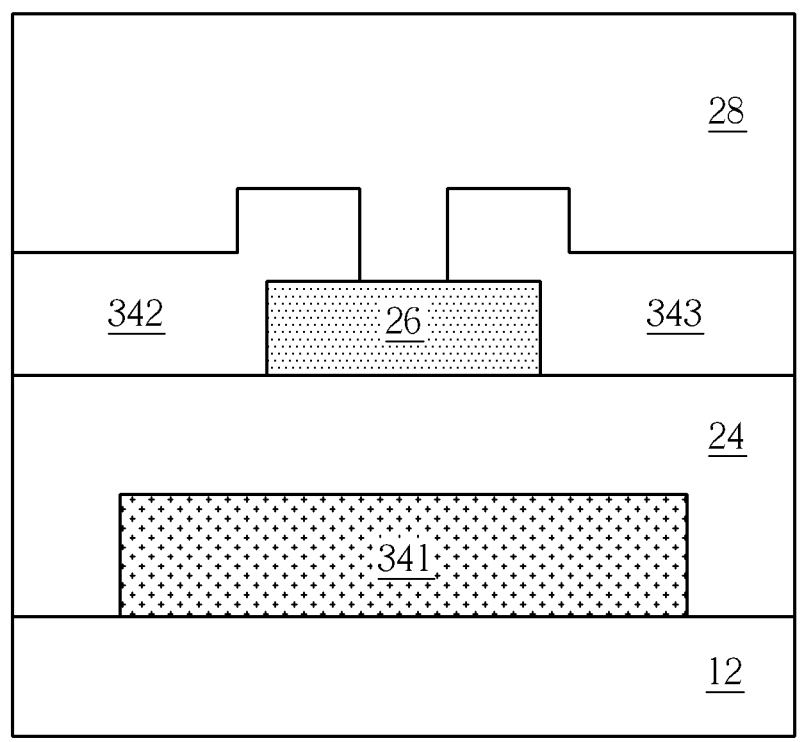
FIG. 7 is a schematic diagram illustrating a connection line region ESD protection device according to another preferred embodiment of the present invention.

Please refer to FIG. 7, and refer to FIG. 1 together. FIG. 7 is a schematic diagram illustrating a connection line region ESD protection device according to another preferred embodiment of the present invention. As shown in FIG. 1 and FIG. 7, the connection line region ESD protection device 34 of this embodiment also can be a floating gate type ESD protection device, which includes a gate 341, a dielectric layer 24, a patterned semiconductor layer 26, two source/drain electrodes 342, 343 and an insulating layer 28. The source/drain electrode 342 is electrically connected to the corresponding first sensing series 16 or second sensing series 18, and the source/drain electrode 343 is electrically connected to the guard ring 32. Different from the previous embodiment, the source/drain electrode 343 of the connection line region ESD protection device 34 in this embodiment is not electrically connected to the gate electrode 341, but the floating gate type ESD protection device formed by the above-mentioned connecting method also can effectively provide ESD protection.

Figure 8:
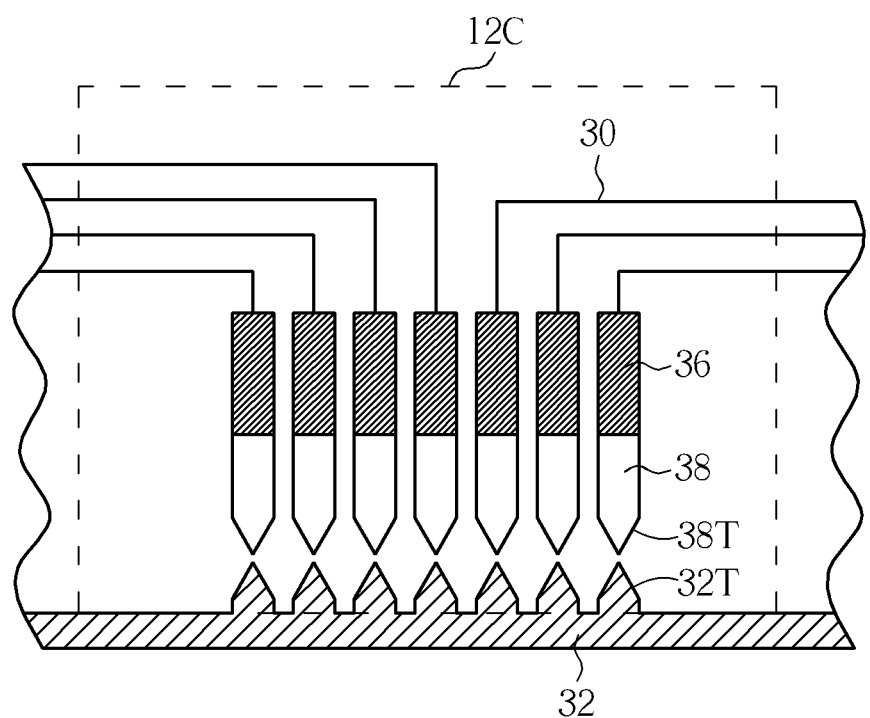
FIG. 8 is a schematic diagram illustrating a connection line region ESD protection device according to a preferred embodiment of the present invention.

Please refer to FIG. 8, and refer to FIG. 1 together. FIG. 8 is a schematic diagram illustrating a connection line region ESD protection device according to a preferred embodiment of the present invention. As shown in FIG. 1, the display panel 12 of the capacitive touch device 10 further includes a contact pad region 12C, a plurality of contact pads 36 disposed in the contact pad region 12C and a plurality of contact pad region ESD protection devices 38 disposed in the contact pad region 12C. Each contact pad 36 is electrically connected to a corresponding connection line 30, and each contact pad region ESD protection device 38 is respectively electrically connected to a corresponding contact pad 36. As shown in FIG. 1 and FIG. 8, each contact pad region ESD protection device 38 includes a discharging tip 38T, and the guard ring 32 also includes a plurality of discharging tips 32T disposed respectively corresponding to the discharging tip 38T of each contact pad region ESD protection device 38. By the design of the discharging tips 38T, 32T, the electrostatic charges accumulated at the contact pads 36 can be effectively transferred to the guard ring 32, and the guard ring 32 can be electrically connected to the ground or other ESD protection circuits, so that the electrostatic charges can be transferred to an outside. Therefore, the ESD protection can be achieved.

Figure 9:
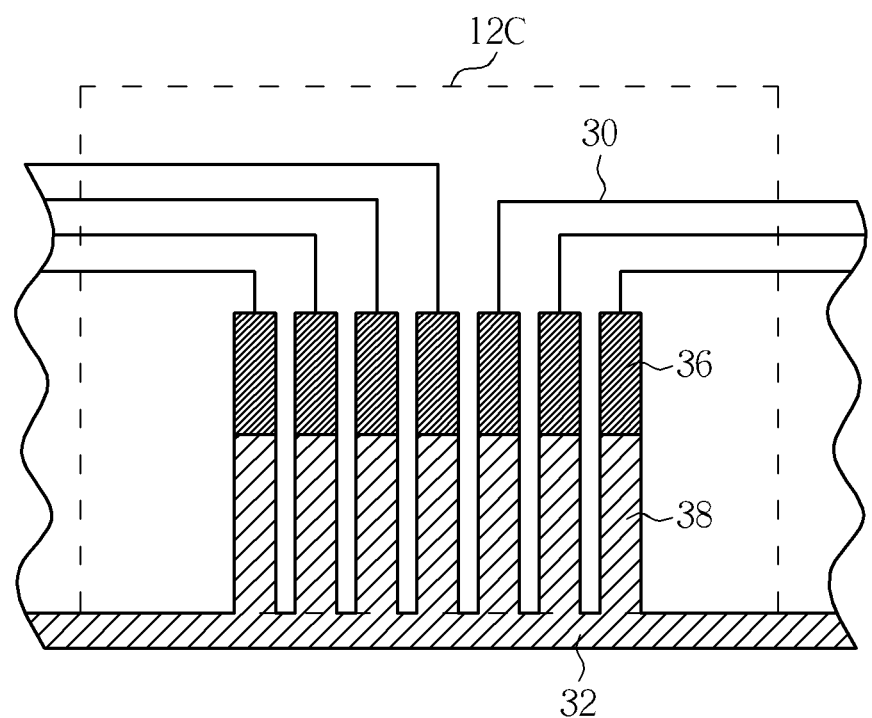
FIG. 9 is a schematic diagram illustrating a connection line region ESD protection device according to another preferred embodiment of the present invention.

Please refer to FIG. 9, which is a schematic diagram illustrating a connection line region ESD protection device according to another preferred embodiment of the present invention. As shown in FIG. 9, different from the previous embodiment, in this embodiment, the contact pad region ESD protection devices 38 is directly electrically connected to the guard ring 32, so that the contact pad region ESD protection devices 38 also provide ESD protection. Furthermore, the electrical connection between each contact pad region ESD protection device 38 and the guard ring 32 will be cut off in the following process, so that a problem of short circuit between the capacitive touch device and each contact pad 36 will not be generated in actual operation.

Figure 10:
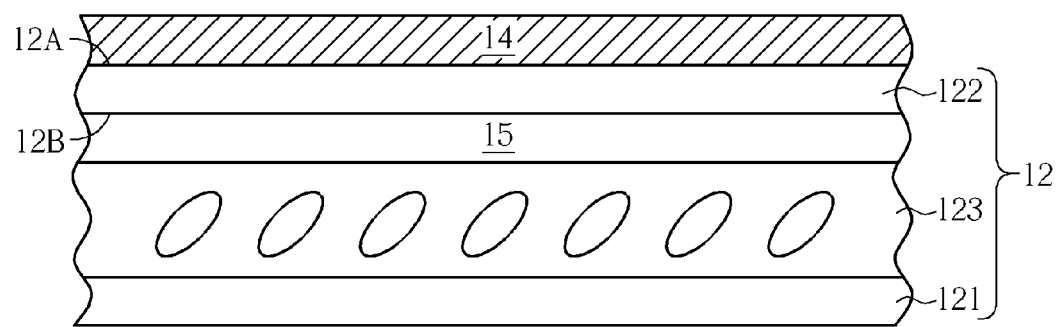
FIG. 10 is a schematic diagram illustrating a capacitive touch device according to a preferred embodiment of the present invention.

As the above-mentioned description, the capacitive touch device can be a capacitive touch display panel having double functions of touch input and display or the capacitive touch substrate only having touch inputting function, and the capacitive touch substrate can be combined with a display panel by an attaching method to form a capacitive touch display panel. Therefore, according to different position that the touch sensing unit has, the capacitive touch device of the present invention has the following different embodiment. Please refer to FIG. 10, which is a schematic diagram illustrating a capacitive touch device according to a preferred embodiment of the present invention. As shown in FIG. 10, for example, the display panel 12 can be a liquid crystal display panel, an organic light-emitting display panel, a plasma display panel, an electrophoresis display panel, etc., but is not limited to this. This embodiment takes the liquid crystal display panel as an example, and the display panel 12 includes an array substrate 121, a color filter substrate 122 and a liquid crystal layer 123 disposed between the array substrate 121 and the color filter substrate 122. An outside of the display panel 12 has an outside surface, such as an outside surface of the color filter substrate 122, and an inside surface, such as an inside surface of the color filter substrate 122. The display panel 12 can further include a color filter layer 15 disposed on the inside surface 12B. In this embodiment, the touch sensing unit 14 is disposed on the outside surface 12A of the display panel 12.

Figure 11:
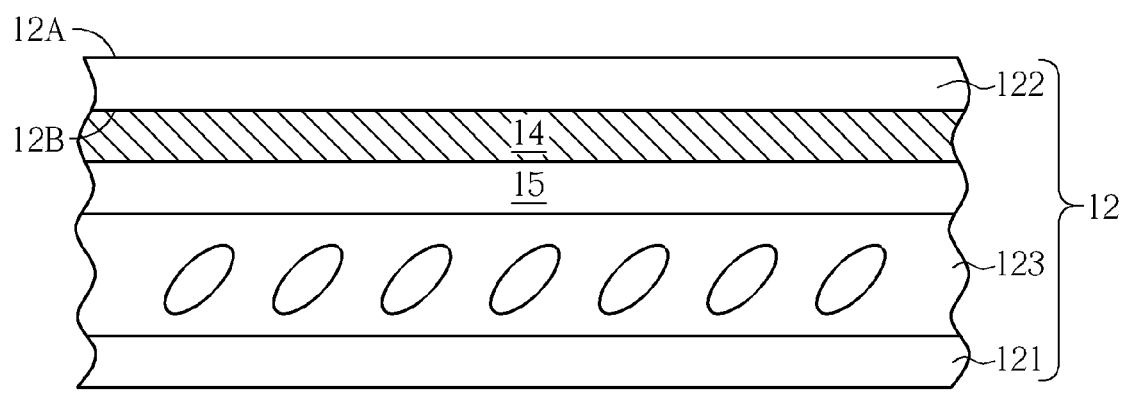
FIG. 11 is a schematic diagram illustrating a capacitive touch device according to another preferred embodiment of the present invention.

Please refer to FIG. 11, which is a schematic diagram illustrating a capacitive touch device according to another preferred embodiment of the present invention. As shown in FIG. 11, in this embodiment, the touch sensing unit 14 can be disposed on the inside surface 12B of the display panel 12.

Figure 12:
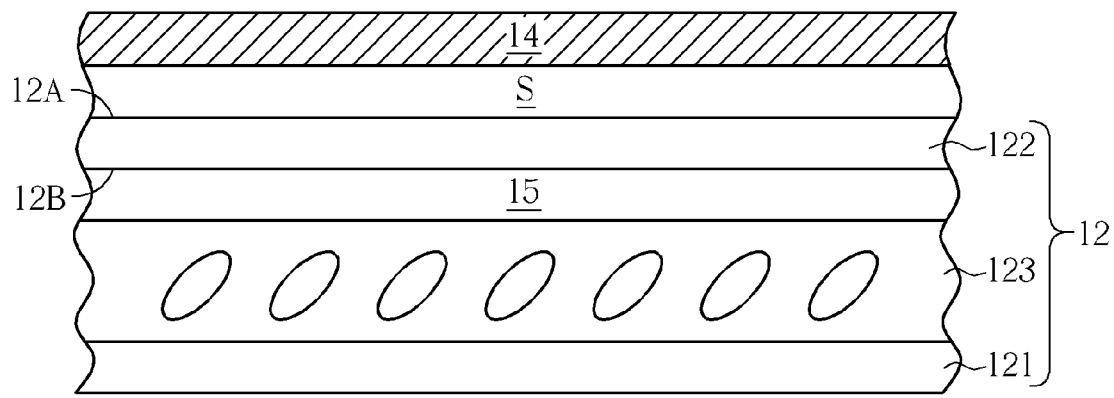
FIG. 12 is a schematic diagram illustrating a capacitive touch device according to another preferred embodiment of the present invention.

Please refer to FIG. 12, which is a schematic diagram illustrating a capacitive touch device according to another preferred embodiment of the present invention. As shown in FIG. 12, in this embodiment, the capacitive touch device further includes an assistant substrate S. The touch sensing unit 14 can be disposed on the assistant substrate S, and the assistant substrate S can be attached to the display panel 12.

Figure 13:
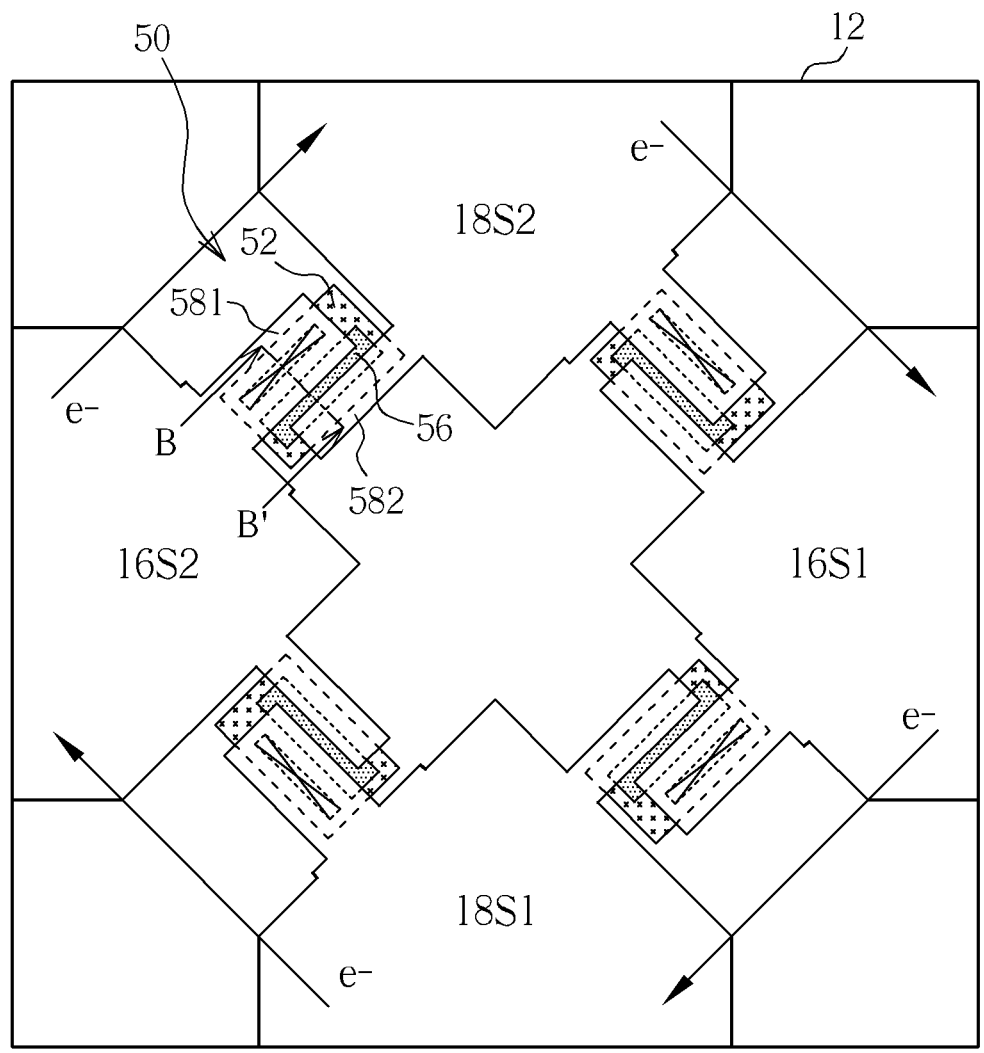
FIG. 13 is a schematic diagram illustrating a sensing region diode ESD protection device according to another embodiment of the present invention.
Figure 14:
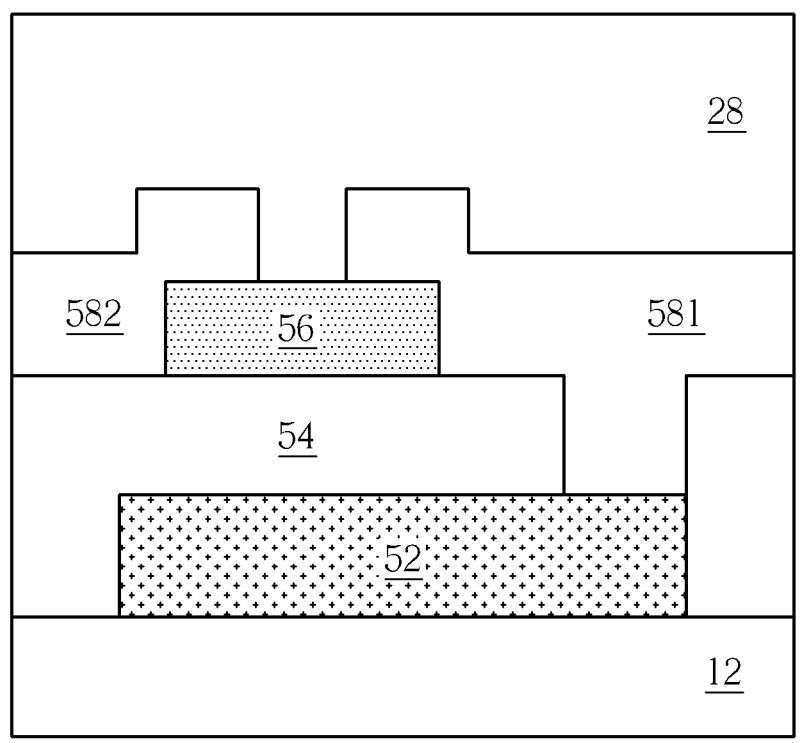
FIG. 14 is a schematic diagram illustrating a cross-sectional view of the diode ESD protection device along line BB' in FIG. 13.

In the aforementioned embodiments, the ESD protection devices are floating gate type ESD protection devices, but the ESD protection devices are not limited thereto. For instance, the sensing region ESD protection devices may be diode ESD protection devices. Different types of diode ESD protection devices serving as ESD protection devices will be detailed in the following embodiments. Please refer to FIGS. 13-14. FIG. 13 is a schematic diagram illustrating a sensing region diode ESD protection device according to another embodiment of the present invention, and FIG. 14 is a schematic diagram illustrating a cross-sectional view of the diode ESD protection device along line BB' in FIG. 13. As shown in FIGS. 13-14, the diode ESD protection device 50 is disposed on the display panel 12, between the first sensing pads 16S1, 16S2 (not shown in FIG. 14) adjacent to each other and electrically disconnected from each other, and between the second sensing pads 18S1, 18S2 (not shown in FIG. 14) adjacent to each other and electrically disconnected from each other. In other words, the first sensing pads 16S1, 16S2 and the second sensing pads 18S1, 18S2 are not directly connected to each other, but are electrically connected to each other via the diode ESD protection device 50. The first sensing pad 16S1 and the first sensing pad 16S2 are disposed in two adjacent first sensing series 16, respectively, and the second sensing pad 18S1 and the second sensing pad 18S2 are disposed in two adjacent second sensing series 18, respectively. The diode ESD protection device 50 includes a gate electrode 52, a dielectric layer 54 (not shown in FIG. 13), a patterned semiconductor layer 56, a first source/drain electrode 581, a second source/drain electrode 582, and an insulating layer 28. The first source/drain electrode 581 is electrically connected to the corresponding first sensing pad 16S2 and the gate electrode 52, and the second source/drain electrode 582 is electrically connected to the corresponding second sensing pad 18S2. The gate electrode 52, the dielectric layer 54, the patterned semiconductor layer 56, the first source/drain electrode 581 and the second source/drain electrode 582 form a transistor device. Since the first source/drain electrode 581 is electrically connected to the gate electrode 52, the transistor device is able to serve as a diode. When the touch sensing signal is a positive voltage signal, the transistor device may be an amorphous silicon thin film transistor (a-Si TFT), a poly-silicon thin film transistor (poly-Si TFT) or an oxide semiconductor thin film transistor (oxide TFT), or preferably an N type transistor device (NMOS TFT). Accordingly, the diode ESD protection device 50 will not be turned on by abnormal touch sensing signal. However, when a huge amount of negative charges e⁻ are accumulated in the touch sensing unit, the diode ESD protection device 50 will be turned on. Consequently, the accumulated negative charges e⁻ will flow to adjacent first sensing pad 16S2 or adjacent second sensing pad 18S2 as shown by the arrow in FIG. 13, and the ESD protection effect can be fulfilled. In this embodiment, the diode ESD protection device 50 has uni-directional ESD protection effect, which means the negative charges e⁻ will only turn on the diode ESD protection device 50 via the first source/drain electrode 581, instead of via the second source/drain electrode 582. Thus, The EDS transmission of the diode ESD protection device 50 is faster, which provides better ESD protection effect.

Figure 15:
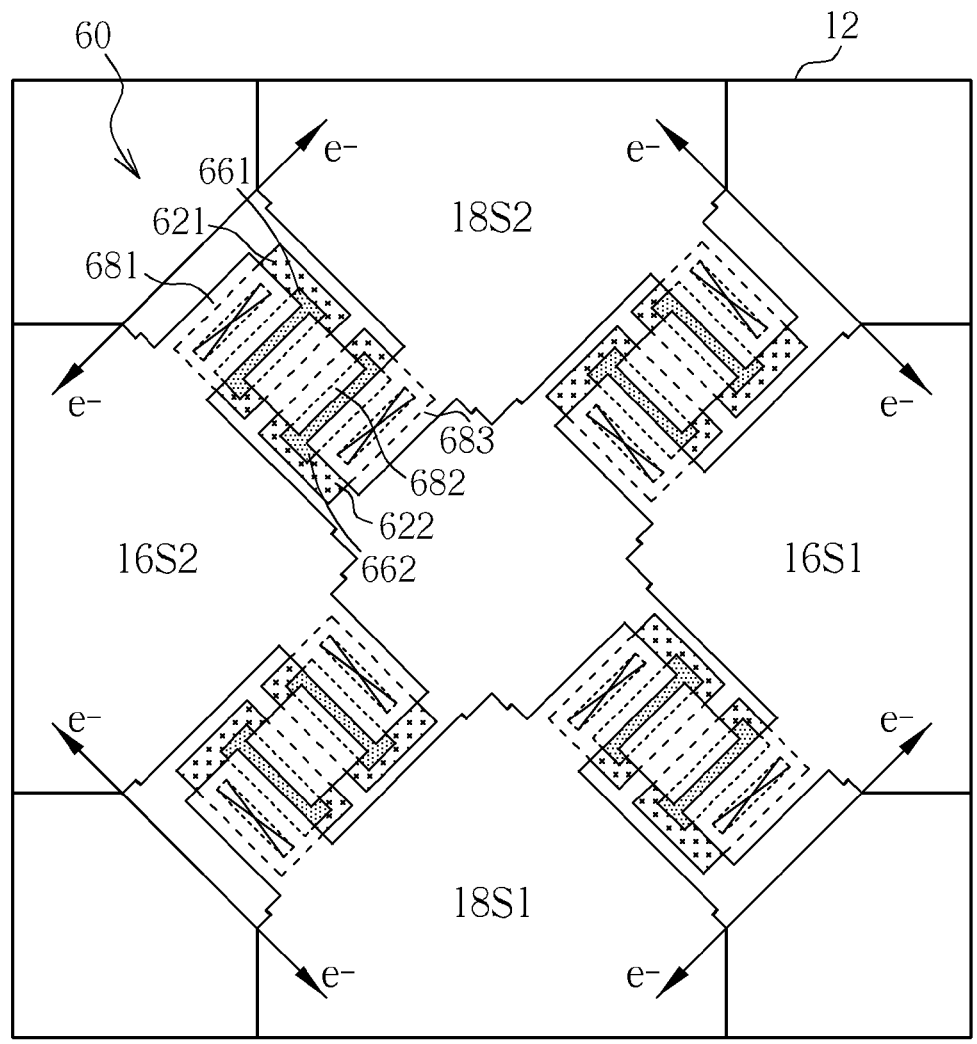
FIG. 15 is a schematic diagram illustrating a sensing region diode ESD protection device according to still another embodiment of the present invention.

Please refer to FIG. 15. FIG. 15 is a schematic diagram illustrating a sensing region diode ESD protection device according to still another embodiment of the present invention. As shown in FIG. 15, the sensing region diode ESD protection device 60 is disposed on the display panel 12, between the first sensing pads 16S1, 16S2 adjacent to each other and electrically disconnected from each other, and between the second sensing pads 18S1, 18S2 adjacent to each other and electrically disconnected from each other. The sensing region diode ESD protection device 60 includes a first gate electrode 621, a second gate electrode 622, a first patterned semiconductor layer 661, a second patterned semiconductor layer 662, a first source/drain electrode 681, a second source/drain electrode 682 and a third source/drain electrode 683. The first source/drain electrode 681 is electrically connected to the corresponding first sensing pad 16S2 and the first gate electrode 621, the second source/drain electrode 682 is floating, and the third source/drain electrode 683 is electrically connected to the corresponding second sensing pad 18S2 and the second gate electrode 622. The first gate electrode 621, the first patterned semiconductor layer 661, the first source/drain electrode 681 and the second source/drain electrode 682 form a first transistor device; the second gate electrode 622, the second patterned semiconductor layer 662, the second source/drain electrode 682 and the third source/drain electrode 683 form a second transistor device. In this embodiment, both the first transistor device and the second transistor device are N type transistor devices. Different from the aforementioned embodiment, the diode ESD protection device 60 has bi-directional ESD protection effect, which means the negative charges e$^-$ may turn on the diode ESD protection device 60 via either the first source/drain electrode 681 or the second source/drain electrode 682. Thus, a better ESD protection effect can be fulfilled.

Figure 16:
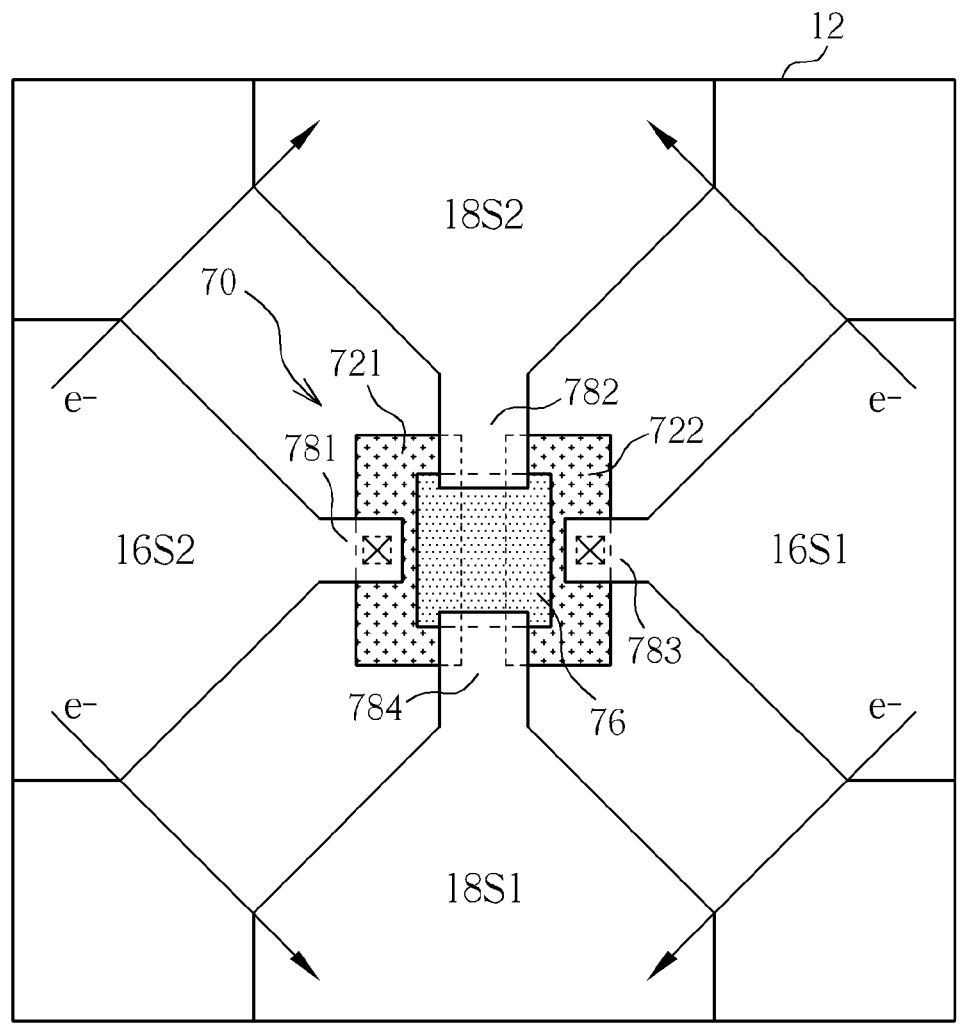
FIG. 16 is a schematic diagram illustrating a sensing region diode ESD protection device according to yet another embodiment of the present invention.

Please refer to FIG. 16. FIG. 16 is a schematic diagram illustrating a sensing region diode ESD protection device according to yet another embodiment of the present invention. As shown in FIG. 16, the diode ESD protection device 70 is disposed on the display panel 12, between the first sensing pads 16S1, 16S2 adjacent to each other and electrically disconnected from each other, and between the second sensing pads 18S1, 18S2 adjacent to each other and electrically disconnected from each other. The diode ESD protection device 70 includes a first gate electrode 721, a second gate electrode 722, a patterned semiconductor layer 76, a first source/drain electrode 781, a second source/drain electrode 782, a third source/drain electrode 783 and a fourth source/drain electrode 784. The first source/drain electrode 781 is electrically connected to the corresponding first sensing pad 16S2 and the first gate electrode 721; the second source/drain electrode 782 is electrically connected to the corresponding second sensing pad 18S2 and the patterned semiconductor layer 76; the third source/drain electrode 783 is electrically connected to another corresponding first sensing pad 16S1 and the second gate electrode 722; and the fourth source/drain electrode 784 is electrically connected to another corresponding second sensing pad 18S1 and the patterned semiconductor layer 76. In this embodiment, a patterned doped semiconductor layer (not shown) e.g. an N type heavily doped layer may be optionally disposed on the patterned semiconductor layer 76, and the second source/drain electrode 782 and the fourth source/drain electrode 784 may be in contact with the patterned doped semiconductor layer, but not limited thereto. Accordingly, the negative charges e$^-$ accumulated in the first sensing pads 16S1, 16S2 may flow to the two adjacent second sensing pads 18S1, 18S2 via the diode ESD protection device 70, and thus ESD protection effect can be implemented. The diode EDS protection device 70 may be modified such that the negative charges e$^-$ accumulated in the second sensing pads 18S1, 18S2 may flow to the two adjacent first sensing pads 16S1, 16S2 via the diode ESD protection device 70.

Figure 17:
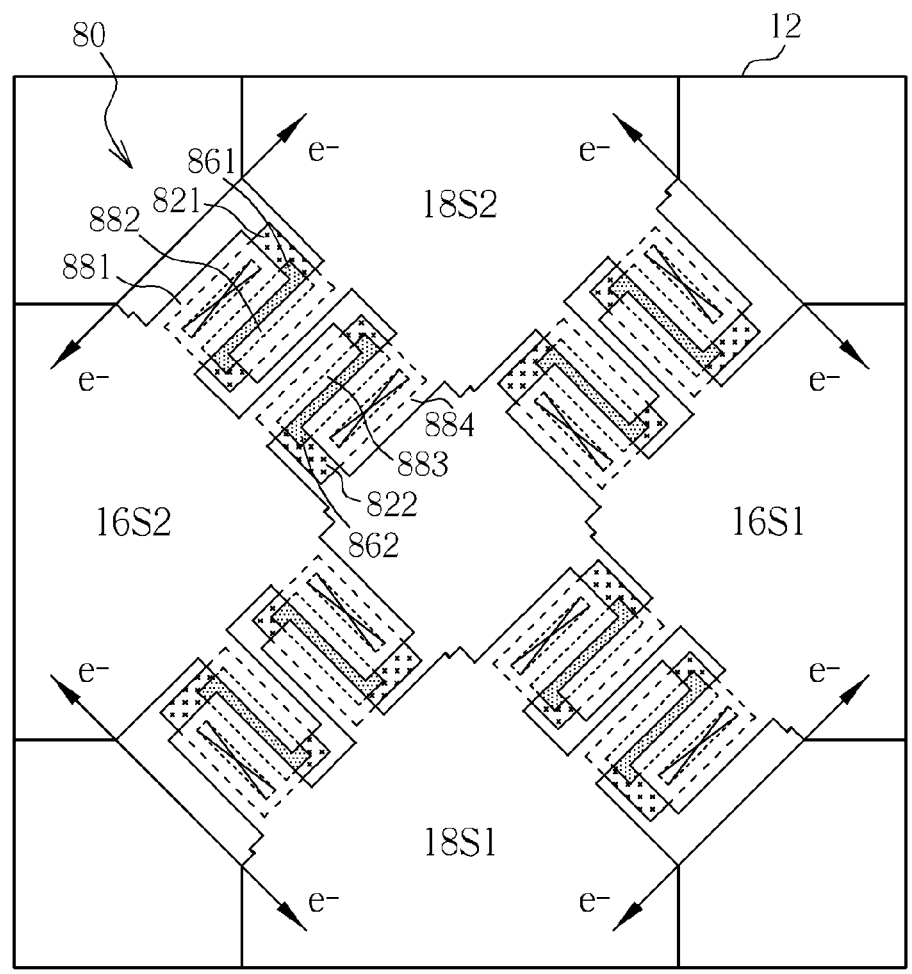
FIG. 17 is a schematic diagram illustrating a sensing region diode ESD protection device according to still another embodiment of the present invention.

Please refer to FIG. 17. FIG. 17 is a schematic diagram illustrating a sensing region diode ESD protection device according to still another embodiment of the present invention. As shown in FIG. 17, the diode ESD protection device 80 is disposed on the display panel 12, between the first sensing pads 16S1, 16S2 adjacent to each other and electrically disconnected from each other, and between the second sensing pads 18S1, 18S2 adjacent to each other and electrically disconnected from each other. The diode ESD protection device 80 includes a first gate electrode 821, a second gate electrode 822, a first patterned semiconductor layer 861, a second patterned semiconductor layer 862, a first source/drain electrode 881, a second source/drain electrode 882, a third source/drain electrode 883 and a fourth source/drain electrode 884. The first source/drain electrode 881 and the third source/drain electrode 883 are electrically connected to the corresponding first sensing pad 16S2; the second source/drain electrode 882 and the fourth source/drain electrode 884 are electrically connected to the corresponding second sensing pad 18S2; the first gate electrode 821 is electrically connected to the first source/drain electrode 881; and the second gate electrode 822 is electrically connected to the fourth source/drain electrode 884. The first gate electrode 821, the first patterned semiconductor layer 861, the first source/drain electrode 881 and the second source/drain electrode 882 form a first transistor device, and the second gate electrode 822, the second patterned semiconductor layer 862, the third source/drain electrode 883 and the fourth source/drain electrode 884 form a second transistor device. In this embodiment, both the first transistor device and the second transistor device may be N type transistor devices. The diode ESD protection device 80 has bi-directional ESD protection effect, which means the negative charges e$^-$ may turn on the diode ESD protection device 80 via either the first source/drain electrode 881 or the fourth source/drain electrode 884. Thus, a better ESD protection effect can be fulfilled. Also, the ESD transmission of the diode ESD protection device 80 is faster, which enhances the ESD protection effect.

It is appreciated that all of the diode ESD protection devices may be applied in the sensing region or the connection line region to provide the ESD protection effect wherever necessary. When applied in the sensing region, the diode ESD protection device is electrically connected to adjacent first sensing pads and second sensing pads. When applied in the connection line region, the diode ESD protection device is electrically connected to the corresponding first sensing series or the corresponding second sensing series, and electrically connected to the guard ring.

Figure 18:
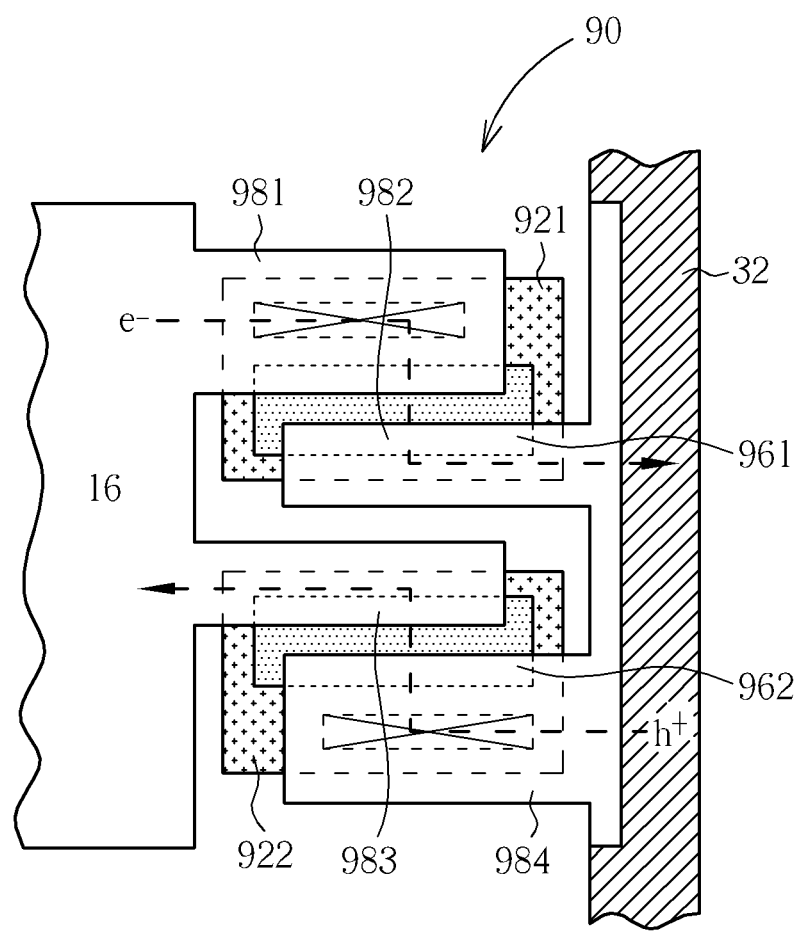
FIG. 18 is a schematic diagram illustrating a connection line region diode ESD protection device according to another embodiment of the present invention.

Please refer to FIG. 18. FIG. 18 is a schematic diagram illustrating a connection line region diode ESD protection device according to another embodiment of the present invention. As shown in FIG. 18, the diode ESD protection device 90 includes a first gate electrode 921, a second gate electrode 922, a first patterned semiconductor layer 961, a second patterned semiconductor layer 962, a first source/drain electrode 981, a second source/drain electrode 982, a third source/drain electrode 983 and a fourth source/drain electrode 984. The first source/drain electrode 981 and the third source/drain electrode 983 are electrically connected to the corresponding first sensing series 16 (or the second sensing series 18); the second source/drain electrode 982 and the fourth source/drain electrode 984 are electrically connected to the guard ring 32; the first gate electrode 921 is electrically connected to the first source/drain electrode 981; and the second gate electrode 922 is electrically connected to the fourth source/drain electrode 984. The first gate electrode 921, the first patterned semiconductor layer 961, the first source/drain electrode 981 and the second source/drain electrode 982 form a first transistor device, and the second gate electrode 922, the second patterned semiconductor layer 962, the third source/drain electrode 963 and the fourth source/drain electrode 964 form a second transistor device. In this embodiment, the first transistor device is an N type transistor device, while the second transistor device is a P type transistor device. The diode ESD protection device 90 has bi-directional ESD protection effect, which means the negative charges e$^-$ may turn on the N type transistor device of the diode ESD protection device 90 via either the first source/drain electrode 981, while the positive charges h$^+$ may turn on the P type transistor device of the diode ESD protection device 90 via the fourth source/drain electrode 984. Thus, a better ESD protection effect can be fulfilled.

In summary, the capacitive touch device of the present invention utilizes the diode ESD protection devices disposed in the sensing region to enhance the ESD protection ability, and in order to raise the ESD protection ability, various kinds of ESD protection devices can be added into the connection line region and the contact pad region. Therefore, whether the capacitive touch device is a capacitive touch display panel or a capacitive touch substrate, the capacitive touch device can provide a better ESD protection ability.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A capacitive touch display panel, comprising:
a display panel, comprising a sensing region;
a touch sensing unit, disposed in the sensing region of the display panel, the touch sensing unit comprising:
a plurality of first sensing series, disposed along a first direction, wherein each of the first sensing series comprises a plurality of first sensing pads electrically connected to each other;
a plurality of second sensing series, disposed along a second direction, wherein each of the second sensing series comprises a plurality of second sensing pads electrically connected to each other; and
a plurality of diode electrostatic discharge (ESD) protection devices, disposed in the sensing region of the display panel, each diode ESD protection device being disposed at least between one of the first sensing pads and one of the second sensing pads adjacent to each other, wherein at least one of the diode ESD protection devices comprises at least one transistor device comprising a first gate electrode, a first patterned semiconductor layer aligned to the first gate electrode, a first source/drain electrode and a second source/drain electrode at both sides of the first patterned semiconductor layer and electrically connected to the first patterned semiconductor layer, respectively, and wherein the first source/drain electrode is electrically connected to the corresponding first sensing pad and the first gate electrode, and the second source/drain electrode is electrically connected to the second sensing pad.

2. The capacitive touch display panel of claim 1, wherein the transistor device comprises at least one N type transistor device.

3. The capacitive touch display panel of claim 1, wherein at least one of the diode ESD protection devices further comprises a second gate electrode, a second patterned semiconductor layer, and a third source/drain electrode, the second source/drain electrode and the third source/drain electrode are at both sides of the second patterned semiconductor layer and electrically connected to the second patterned semiconductor layer, respectively, and wherein the third source/drain electrode is electrically connected to the corresponding second sensing pad and the second gate electrode.

4. The capacitive touch display panel of claim 1, wherein at least one of the diode ESD protection devices further comprises a second gate electrode, a third source/drain electrode and a fourth source/drain electrode at both sides of the first patterned semiconductor layer and electrically connected to the first patterned semiconductor layer, respectively, the first source/drain electrode is electrically connected to the corresponding first sensing pad and the first gate electrode, the second source/drain electrode is electrically connected to the corresponding second sensing pad, the third source/drain electrode is electrically connected to another corresponding first sensing pad and the second gate electrode, and the fourth source/drain electrode is electrically connected to another corresponding second sensing pad.

5. The capacitive touch display panel of claim 1, wherein at least one of the diode ESD protection devices further comprises a second gate electrode, a second patterned semiconductor layer, a third source/drain electrode and a fourth source/drain electrode at both sides of the second patterned semiconductor layer and electrically connected to the second patterned semiconductor layer, respectively, the first source/drain electrode and the third source/drain electrode are electrically connected to the corresponding first sensing pad, the second source/drain electrode and the fourth source/drain electrode are electrically connected to the corresponding second sensing pad, the first gate electrode is electrically connected to the first source/drain electrode, and the second gate electrode is electrically connected to the fourth source/drain electrode.

6. The capacitive touch display panel of claim 1, wherein the display panel has an outside surface outside the display panel, and the touch sensing unit is disposed on the outside surface.

7. The capacitive touch display panel of claim 1, wherein the display panel has an inside surface inside the display panel, and the touch sensing unit is disposed on the inside surface.

8. The capacitive touch display panel of claim 7, further comprising a color filter layer disposed on the touch sensing unit.

9. The capacitive touch display panel of claim 1, further comprising an assistant substrate, the touch sensing unit being disposed on the assistant substrate, and the assistant substrate being attached to the display panel.

10. The capacitive touch display panel of claim 1, further comprising a connection line region and a plurality of connection lines disposed in the connection line region, and the connection lines are electrically connected to the first sensing series and the second sensing series, respectively.

11. The capacitive touch display panel of claim 1, further comprising a guard ring disposed in the connection line region.

12. The capacitive touch display panel of claim 2, further comprising a plurality of connection line region ESD protection devices, wherein each connection line region ESD protection device is electrically connected to each corresponding first sensing series or each corresponding second sensing series respectively, and each connection line region ESD protection device is electrically connected to the guard ring.

13. The capacitive touch display panel of claim 12, wherein the connection line region ESD protection devices comprise a plurality of diode ESD protection devices.

14. The capacitive touch display panel of claim 13, where each of the diode ESD protection devices comprises a first gate electrode, a second gate electrode, a first patterned semiconductor layer, a second patterned semiconductor layer, a first source/drain electrode, a second source/drain electrode, a third source/drain electrode and a fourth source/drain electrode, the first source/drain electrode and the third source/drain electrode are electrically connected to the corresponding first sensing series or the corresponding second sensing series, the second source/drain electrode and the fourth source/drain electrode are electrically connected to the guard ring, the first gate electrode is electrically connected to the first source/drain electrode, and the second gate electrode is electrically connected to the fourth source/drain electrode.

15. The capacitive touch display panel of claim 14, wherein the first gate electrode, the first patterned semiconductor layer, the first source/drain electrode and the second source/drain electrode of each diode ESD protection device form an N type transistor device, and the second gate electrode, the second patterned semiconductor layer, the third source/drain electrode and the fourth source/drain electrode of each diode ESD protection device form a P type transistor device.

16. The capacitive touch display panel of claim 10, further comprising a contact pad region and a plurality of contact pads disposed in the contact pad region, and each contact pad is electrically connected to each corresponding connection line, respectively.

17. A capacitive touch board, comprising:
a substrate, having a sensing region;
a touch sensing unit, disposed in the sensing region of the substrate, the touch sensing unit comprising:
a plurality of first sensing series, disposed along a first direction, wherein each of the first sensing series comprises a plurality of first sensing pads electrically connected to each other;
a plurality of second sensing series, disposed along a second direction, wherein each of the second sensing series comprises a plurality of second sensing pads electrically connected to each other; and
a plurality of diode ESD protection devices, disposed in the sensing region of the substrate, each diode ESD protection device being disposed between one of the first sensing pads and one of the second sensing pads adjacent to each other, wherein at least one of the diode ESD protection devices comprises at least one transistor device comprising a gate electrode, a patterned semiconductor layer aligned to the gate electrode, a first source/drain electrode and a second source/drain electrode at both sides of the patterned semiconductor layer and electrically connected to the patterned semiconductor layer, respectively, and wherein the first source/drain electrode is electrically connected to the corresponding first sensing pad and the gate electrode, and the second source/drain electrode is electrically connected to the second sensing pad.

* * * * *